United States Patent [19]

Casale

[11] 4,035,259

[45] July 12, 1977

[54] METHOD FOR PREPARATION OF INORGANIC FLOCCULATING COMPOSITION

[75] Inventor: Liborio Casale, Brescia, Italy

[73] Assignee: Caffaro, S.p.A., Societa per l'Industria Chimica ed Elettrochimica, Milan, Italy

[21] Appl. No.: 626,846

[22] Filed: Oct. 29, 1975

[30] Foreign Application Priority Data

Nov. 12, 1974 Italy .................................. 29361/74

[51] Int. Cl.² ........................ C02B 5/02; C02B 1/20
[52] U.S. Cl. .............................. 252/175; 210/23 R; 210/52; 252/181
[58] Field of Search ............. 252/175, 181; 210/23, 210/52, 56

[56] References Cited

U.S. PATENT DOCUMENTS

| | | | |
|---|---|---|---|
| 2,284,827 | 6/1942 | Lindsay et al. | 252/175 |
| 2,362,022 | 11/1944 | Olin | 252/175 |
| 3,342,742 | 9/1967 | Cocks | 252/175 |
| 3,388,060 | 6/1968 | Clark | 252/175 |
| 3,446,742 | 5/1969 | Bacon | 252/175 |

*Primary Examiner*—Mayer Weinblatt
*Attorney, Agent, or Firm*—Stevens, Davis, Miller & Mosher

[57] ABSTRACT

The invention relates to an inorganic flocculating composition consisting of water soluble salts of Al, Fe, Mg and Ca and obtained by attacking clays containing the above chemical elements, the attack being carried out with an acid capable of forming water soluble salts of the said chemical elements. The said composition is capable of destroying the stability of colloidal slurries and can be employed without involving strict conditions, such as pH, temperature and so on.

2 Claims, No Drawings

METHOD FOR PREPARATION OF INORGANIC FLOCCULATING COMPOSITION

This invention relates to an inorganic composition which is useful for the clarification of turbid waters, more particularly civil and industrial sewage waters, or also waters intended to be made potable or for special industrial applications. Moreover, the invention relates to the method for the manufacture of the composition in question.

It is well known that flocculation is a compulsory measure for the separation, from more or less turbid waters, of very minute particles, often in colloidal form, said particles being coalesced into more or less large flocks and then separated by precipitation or sedimentation of such flocks.

Among the products which find a wide acceptance as flocculants and clarifiers, possibly used concurrently with coagulation acids, there are the water soluble chlorides and sulphates of metals such as aluminium, iron and magnesium. However, for using such substances, the presence or occurence is imperative of particular conditions such as pH, concentration, solubility product and others in the water to be treated. In addition, usually, each substance solves a specific problem (such as the removal of phosphates in the case of ferric chloride), without nevertheless supplying a solution to problems of the same importance (for example the presence of iron, even in trace amounts, in the clarified water prevents its use in the textile dyeing processes and in the paper industry).

A principal object of the present invention is a novel composition of inorganic type, based on soluble salts of Al, Fe Mg and possibly Ca, which is capable of simultaneously solving the several problems which are connected to the use of individual flocculants as listed hereinabove.

To this purpose, the inorganic flocculating composition according to the present invention is characterized in that it contains, in combination, water soluble salts of Al, Fe, Mg and Ca, said composition being obtained by treating clays which contain, in a form which can be attacked by the acids, the above listed chemical elements.

In its turn, the method according to the present invention contemplates the following stages:

a. slurrying the raw clay so as to obtain a semifluid slurry having a percentage contents of solids between the 33% and the 55% on a weight basis, the clay particles having a size of not more than 1 millimeter in diameter.

b. treating the stirred slurry or suspension with an acid which is capable to form with Al, Fe, Mg and Ca, water soluble salts with an increase of the temperature up to 90° C approximately.

c. completing the acid attack on the clay by a heat treatment of the mixture, preferably in an autoclave at a temperature of about 150° C and a pressure of about 4 atmospheres.

d. gradual cooling of the mixture and filtration, with separation of a solid residue and liquid phase, the latter constituting the composition according to the present invention.

This composition, which can possibly be concentrated until containing a dry product, has the form of a light-yellow liquor, which is strongly acidic due to the presence of a free acid, the phsico-chemical characteristics of which are of course a function of the acid utilized for attacking the clay.

Field tests as conducted with the compositions according to the present invention, more particularly those obtained by attacking a clay with sulphuric acid, have shown the property of such compositions of destroying the stability of colloidal slurries, thus permitting the coagulation of the particles in suspension and the subsequent flocculation. More specifically, such a composition according to the present invention is characterized by:

a. a high coagulating and clarifying power
b. colourless residual sludges
c. turbidity less than 1 JTU in the treatment of superficial waters
d. a wide range of the working pH
e. compatibility, in the case of treatment of superficial waters, with oxidizing preliminary treatments, more particularly chlorination.

Without establishing any undue limitations to the scope of the present invention, the excellent results as obtained with the use of the compositions according to the present invention seem to be due not only to the combined action of the individual soluble salts which are present, but also to a synergistic action of same. As a matter of fact, comparative tests as performed both with the individual salts and with compositions which have been artificially prepared by the admixture of the individual salts in the ratios as found in the chemical percentage analysis of the compositions according to the present invention, have shown that the action of these compositions is by far more efficient.

Other applications for which the compositions according to the present invention lend themselves, are the flotation treatments and the phosphate reduction processes.

For using the compositions according to the present invention the working conditions and more especially the dosages should be selected on the basis of tests (such as the Jar test) having the purpose of detecting a few parameters of the water to be treated.

Outlined above, the method according to the present invention provides for the acid attack of clays. As the clays, those should be selected which contain aluminium, iron, calcium and magnesium, which are usually present in the oxide form. Of special advantage have proven to be the bentonite clays which can be chemically defined as aluminium silicates.

The acids which are preferred in the method according to the present invention are the inorganic acids which are capable of forming water soluble salts: concentrated sulphuric acid and hydrochloric acid are preferred.

An example of preparation of the compositions according to the present invention will now be given by way of illustration and without limitation.

EXAMPLE

A bentonite clay is used, which has the following average contents of its principal components:

| | |
|---|---|
| $SiO_2$ | 59% – 60% |
| $Al_2O_3$ | 18% – 19% |
| $Fe_2O_3$ | 3% – 4% |
| CaO | 2% – 3% |
| MgO | 4% – 5% |

The raw clay, which has the form of clods of various size, is slurried in a wet mill, by metering the quantity of water which is necessary to obtain a semifluid slurry in which the percentage of dry matter can vary from 33% to 35%, with a specific gravity of 1.27 – 1.28.

The slurrying if the clay has the purpose of forming a slurry in which the sizes of the solid particles are as small as possible, at least not over one millimeter.

The high fineness of the particles enables them to be most efficiently dispersed in water in order subsequently to improve the intimate contact with the acid.

The suspension is introduced in a set of vessels and 98% sulphuric acid is added thereto.

The quantity of sulphuric acid is calculated on the basis of 45% with respect to the contents of dry substance which is present in the clay slurry: thus the concentration of attack of the acid takes a value of about 19%.

The mass is stirred so that the admixture of the acid is fully satisfactory, then the temperature is gradually raised up to a value of about 90° C by steam blowing. This first "pre-cooking" stage lasts for one hour. It has the purpose of priming the attack reaction on the elements Al, Fe Mg, Ca as present in the clay, to convert them into sulphates.

The acidified slurry is then transferred in autoclaves when the temperature is raised to 150° C under a pressure of 4 atmospheres, the stay being 4 hours. This is the stage in which the acid attack of clay is completed in order to salify and solubilize as much as possible of the Al, Fe, Mg ions.

The acidic mass is discharged from the autoclaves into collecting vessels while undergoing, during the transfer, a temperature decrease in heat exchangers down to 40° C – 45° C.

At this temperature filtration is started, by using filter presses where the separation of the solid and liquid phases takes place under a pressure of about 6 atmospheres.

The liquid stock is stored in PVC and glass resin tanks. It is a light-yellow liquor, which is positively acidic due to free sulphuric acid and having a specific gravity at 20° C of 1.18 – 1.19, containing in solution Al, Fe, Mg and Ca sulphates, according to the following average composition.

| Total $H_2SO_4$ | 178 | grams/liter |
|---|---|---|
| Free $H_2SO_4$ | 35 | grams/liter |
| Iron | 5.2 | grams/liter |
| Aluminium | 17.8 | grams/liter |
| Calcium | 0.9 | grams/liter |
| Magnesium | 6.5 | grams/liter |

Iron is, for its 70% – 90%, mainly ferric iron. Heavy and toxic metals are absent.

As regards the conditions of use of the compositions according to the present invention, the liquid solution as obtained with the above described method has a water contents which is adapted to the use of the product as such; the solution, after the above indicated tests, is added to the water to be treated with vigorous stirring for 90 – 120 seconds, whereafter the precipitation of the flock begins.

The invention has been described in connection with a preferred embodiment, it being however understood that modifications and changes which are theoretically equivalent can be made while remaining within the scope of this invention.

What we claim is:

1. A method for the preparation of a liquid flocculating composition comprising the steps of:
    a. slurrying raw clay containing Al, Fe, Mg and Ca elements so as to obtain a semi-fluid slurry with a percentage of dry matters between 33% and 55% on a weight basis, the particles of the clay being of a size of not over 1 millimeter in diameter;
    b. treating while stirring the clay or suspension with an inorganic acid capable of forming Al, Fe, Mg and Ca water soluble salts at a temperature up to about 90° C;
    c. completing the acid attack of the clay at a temperature of about 150° C under a pressure of about 4 atmospheres;
    d. progressively cooling the mixture and
    e. filtrating said mixture into a solid residue and a liquid phase.

2. The method according to claim 1, wherein said clay is bentonite clay and said acid is v% concentrated sulphuric acid.

* * * * *